United States Patent Office 2,832,029
Patented Apr. 22, 1958

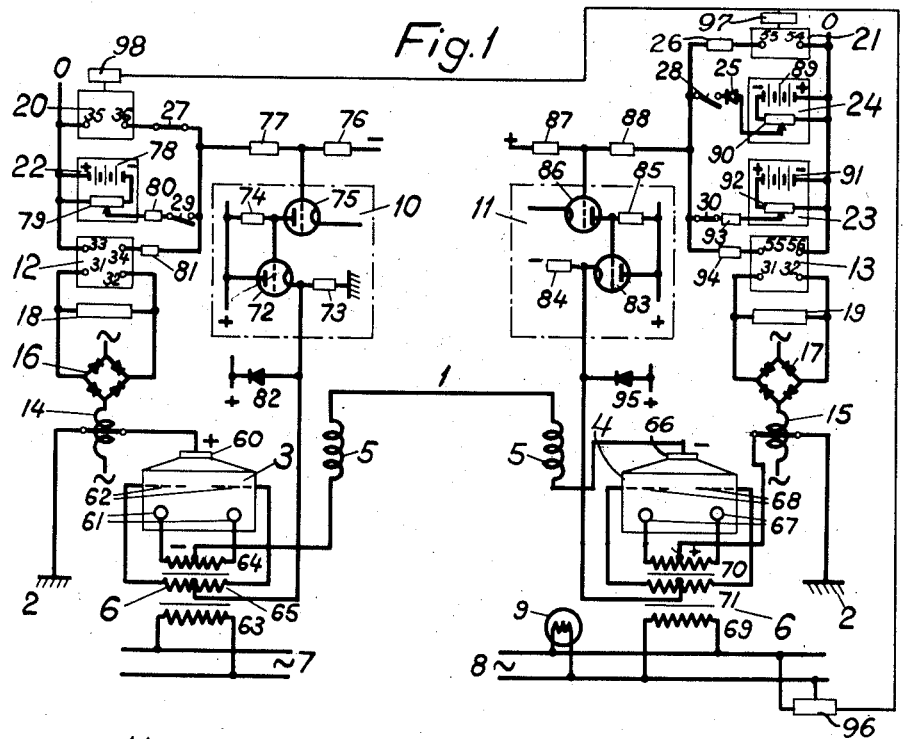

2,832,029

CONTROL DEVICE FOR THE REGULATION OF STATIC CONVERTERS IN A HIGH VOLTAGE D. C. TRANSMISSION PLANT

Harry Forssell, Ludvika, Sweden, assignor to Allmänna Svenska Elektriska Aktiebolaget, Vasteras, Sweden, a corporation of Sweden Application September 1, 1955, Serial No. 531,868

Claims priority, application Sweden September 7, 1954

12 Claims. (Cl. 321—2)

The present invention relates to a high voltage D. C. transmission plant in which electrical energy, supplied by an A. C. network, is converted to high voltage D. C. in one or several rectifier stations. This D. C. current is transmitted either on airlines or cables to one or several inverter stations, where the energy is converted again to A. C. current and supplied to an A. C.-network. Power transmission systems of this type can either be run with constant transmission current and varying D. C. voltage in the converter stations or with constant D. C. voltage in at least one of the converter stations, whilst the transmitted D. C. current varies depending on the energy demand. The last mentioned alternative has the advantage that the converters can work with higher efficiency and greater safety. One of the converter stations, e. g. the inverter station, then determines the transmission voltage in the D. C. system, which transmission voltage in the final resort is given by the A. C. voltage, generated in the receiving A. C. network by generators or synchronous capacitors. The inverter station in question is in this case controlled by a grid control device which suitably safeguards a constant commutation margin. In this case in at least one of the rectifier stations the D. C. voltage is controlled in such a way that a controlled quantity, e. g. the frequency in the receiving A. C.-network or the transmitted power or the transmitted current itself assume predetermined values. In certain cases instead of it the transmission voltage is kept constant by at least one of the rectifier stations, while the inverters in at least one of the inverter stations are controlled to maintain such a D. C. voltage that the transmitted D. C. current has such a value that a controlled quantity, e. g. one of the above mentioned quantities, assumes predetermined values. Whilst such a constant transmission voltage system has many advantages under normal service conditions it has for instance at commutation failure in an inverter station or on the occasion of other short-circuits in the D. C. system the disadvantage that the D. C. current in the rectifier station may increase up to unpermitted high values. On the occasion of such a fault a constant current system would act more conveniently.

One object of the present invention is to eliminate the difficulties appearing in a constant voltage system at faults. According to the invention means, influenced by the transmitted power current magnitude or its alteration are provided to affect the control system of the power plant by an output signal (current signal), rapidly responding in relation to a main signal, in such a way that the means on the occasion of a fault in the plant tend to maintain the power current on its actual value, whilst they, under normal conditions, act stabilizing at main signal actions. The main signal may be a quantity, depending on the controlled quantity or its deviations from a reference value. It may, however, be depending, besides on the controlled quantity, on an additional quantity, which slowly is controlled to assume such a value that the deviation of the controlled quantity from a reference value is reduced to zero. The main signal may also be a quantity representing the desired transmission voltage. The current signal and the main signal may affect the control system of the power plant in a different way and at different points. According to a form of the invention both of the mentioned quantities affect a common regulator, controlling the converter grids in one and the same station. The two signals may, however, affect the control system of the power plant in such a way, that for instance in one or several converter stations both of them act on a common regulator, whilst on the other converter stations only the current signal affects the regulators there.

Further objects and advantages of the invention will appear more fully from the following description, especially when taken in conjunction with the accompanying drawings which form a part thereof. Fig. 1 shows the power transmission system and the design of the control system. In the Figs. 2, 3 and 4 three variants of the current signal means 12 (13) and the main signal means 20 (21) are shown. Finally Fig. 5 shows an alternative form of the current signal means 12 (13).

Fig. 1 shows the transmission line 1 of the high voltage D. C. power plant, which line may be an air line or a conductor in a cable. The transmission plant is fed by a rectifier 3, provided with the cathode 60, two anodes 61 and two grids 62. A converter transformer 6 is by one of its windings 63 connected to the feeding A. C.-network 7. One of its secondary windings 64 is through its end terminals connected to the anodes 61, whilst the middle terminal is connected to the power line 1 via a damping reactor 5. The rectifier grids 62 receive their control signals from the transformer winding 65, phase-shifted in relation to the winding 64, the middle point potential of it is increased or decreased by the D. C. potential supplied by the regulator 10. The cathode 60 is at the point 2 connected to ground, which constitutes the return for the current. At the receiving point the high voltage D. C. current is converted to A. C. current in the inverter 4. The inverter 4 contains a cathode 66, two anodes 67 and two grids 68. A transformer 6 is by its winding 69 connected to the receiving A. C.-network 8. The transformer winding 70 is connected to the anodes 67 and by its middle point to ground at the point 2. The transformer winding 71 phase-shifted in relation to the winding 70 takes care of the grid control and receives its middle point potential from the regulator 11. The cathode 66 is connected to the transmission line 7 via the damping reactor 5.

The grid potential control of the rectifier 3 is carried out, as mentioned, by the regulator 10. That comprises an output tube 72 and a cathode resistor 73. The tube grid is connected to the anode resistor 74, provided in the anode circuit of the amplifier tube 75. The grid bias potential of that tube is determined by the current flowing from the connection bar O via the transmitters 12, 20, 22 to minus through the resistors 77 and 76. The transmitter 12 supplies to the regulator 10 a current signal which is influenced by the transmitted power current magnitude or its alterations. The power current is measured by the magnetic amplifier 14, the output current of which is rectified in the rectifier 16 and supplied to the resistor 18. The voltage across this resistor, being substantially proportional to the transmitted power current, is supplied to the transmitter 12 via the terminals 31 and 32. The regulator 10 is further influenced by the transmitter 12 which supplies the main signal. Its terminals are designated by 35 and 36. Further there is an auxiliary signal transmitter 22. It supplies to the regulator 10 an auxiliary signal which is directed opposite the current signal, transmitted by the transmitter 12, in that direction in which the action of this transmitter has to be limited, as will be described later on. In the form shown in the figure the auxiliary transmitter 22 comprises a current source 78 connected to a potentiometer 79. By means of a movable arm an auxiliary signal is derived from this potentiometer, being negative in relation to the zero bar and driving a current through the resistor 80. An electric valve 82 is connected in between the cathode of the output tube 72 and a high positive limiting voltage and thus prevents the mentioned cathode potential from becoming higher than this limiting potential.

In the inverter station the regulator 11 is designed in a similar way as the regulator 10 in the rectifier station. Across the cathode resistor 84 the regulator supplies an output potential which determines the potential in the middle point of the transformer winding 71. This potential is changed by the output tube 83, the grid of which is controlled by the amplifier tube 86 and its anode resistor 85. The tube 86 has a grid bias potential which is determined by the current flowing from plus through the resistors 87 and 88 and the transmitters 13, 21, 23 and 24 to the zero connection bar of these transmitters. The transmitter 13 supplies via its terminals 55 and 56 and through the series connected resistor 94 a current signal corresponding to the power current magnitude or its alterations. The transmitter is via a parallel connected resistor 19 fed by a measuring rectifier 17, rectifying the A. C. current, which is supplied by the measuring magnetic amplifier 15, and thus supplying a D. C. current to the resistor 19, which current is substantially proportional to the power current. The transmitter 23 consists in the shown form of a current source 91, connected to a potentiometer 92. From this potentiometer an auxiliary signal is derived via the series resistor 93, the signal being positive in relation to the zero bar and being combined with the currents supplied by the other transmitters. The regulator 11 is further affected by the transmitter 21, representing the main signal. Its terminals are designated by 53 and 54 and its series resistor by 26. Further there is in the inverter station a restraining transmitter 24, consisting of a D. C. current source 89 and a potentiometer 90, from which transmitter and in relation to the zero bar negative voltage is derived. The transmitter 24 is connected to the regulator 11 via an electric valve 25. Finally there is an electric valve 95, connected in between the cathode of the output tube 83 and a low positive limiting voltage. It prevents the mentioned cathode potential from becoming lower than this limiting potential.

In the rectifier station the transmitter 12 and in the inverter station the transmitters 13 and 21 are continuously connected to the regulators 10 and 11 respectively. The other transmitters are connected in by the contacts 27 and 29 in the rectifier station and by the contacts 28 and 30 in the inverter station. When the contacts 27 and 30 are closed the contacts 28 and 29 are open and vice versa.

In Fig. 2 there is shown one of the possible forms of the transmitters 12 and 13 respectively, depending on the transmitted power current magnitude or its alterations, and of the transmitters 20 and 21 respectively, representing the main signal. The D. C. voltage, produced by the measuring magnetic amplifier according to Fig. 1, which voltage is substantially proportional to the transmitted power cuurrent, is supplied to the input terminals 31 and 32 of the transmitter 12. The capacitor 38 and the resistor 39 are connected to these terminals. On the occasion of power current alterations a current flows through the capacitor 38, producing a voltage drop across the resistor 39. This voltage drop is supplied to the regulator 10 via the terminals 33 and 34. The transmitter 20 is in this case constituted by a receiver 40, reproducing the controlled quantity. This may for instance be the frequency in the receiving A. C.-network 8 which has to be regulated to a predetermined value. The reference value, which the controlled quantity has to assume, is set on the potentiometer 41 by means of the movable contact 42. When the controlled quantity has the predetermined value its deviation from the reference value is zero and none or an inconsiderable voltage is supplied to the rectifier 10 via the terminals 35 and 36. In the contrary case a positive or negative voltage is found between the terminals and the regulator is affected in one or the other direction. The reiver 40 may receive the frequency value from the A. C.-network by means of a telemetering equipment. The comparison between the controlled quantity and its reference value may also be completely made in the inverter station, only the difference between these quantities being telemetered to the rectifier station and affecting the regulator 10 via its terminals 35 and 36.

The control system affecting the D. C. power plant and shown in Figs. 1 and 2 functions in the following way:

The power plant is assumed to run under undisturbed conditions. It is further assumed that the plant has to supply such an energy contribution to the receiving A. C.-network 8 that the frequency in this network is kept constant at a predetermined value. From this network a measuring value is transmitted by telemetering circuit 96, 97, 98 to the transmitter 20 in the rectifier station, which value represents either the frequency in the A. C.-network 8 or its deviation from a predetermined reference value. In any case the deviation is reproduced between the terminals 35 and 36 of the transmitter 20. At the same time the frequency or its deviation from the reference value is supplied to the transmitter 21 in the inverter station, this transmitter in principle being equal to the transmitter 20 in the rectifier station. The frequency deviation thus occurs between the terminals 53 and 54. If the telemetering communication between the stations is intact the contacts 27 and 30, as shown, are closed whilst the contacts 28 and 29, as shown, are open. This means that the main signal affects as well the regulator 10 as the regulator 11. Of the auxiliary transmitters 22 and 23 only the transmitter 23 is connected in thus affecting the regulator 11. The restraining transmitter 24, which will be described later on, is uneffective. It is assumed that under these conditions the inverter station determines the transmission voltage of the plant whilst the rectifier station by means of its regulator 10 affects the system in such a way that the frequency in the A. C.-network 8 is kept constant. When the frequency is correct and no power current alterations occur the control system is in balance and only the auxiliary transmitter 23 in the inverter station supplies a signal to the regulator 11. This signal is positive. It is true that positive signals in the inverter station correspond to an increase of the inverter D. C. voltage, i. e. to a decrease of the transmitted power current. However, the electric valve 95 prevents the output potential of the regulator from attaining a lower positive value than that of the limiting voltage. Thus the inverter voltage is prevented from exceeding a value, so chosen that a good commutation margin is obtained. The auxiliary transmitter 23 therefor is uneffective for the time being. If for instance by connecting in consumers in the A. C.-network 8 the frequency drops, the frequency deviation will become negative with the result that a main signal voltage will appear between the terminals 35 and 36 in the transmitter 20 and between the terminals 53 and 54 in the transmitter 21, which voltage is negative in relation to the zero bar. In the rectifier station a negative signal decreases the voltage drop across the resistor 76. The amplifier tube grid bias potential 75 thus becomes more negative and decreases the tube current. The voltage drop across the anode resistor 74 is therefor decreased with the result that the grid bias potential of the output tube 72 becomes more positive. Its current is then increased, increasing the voltage drop across the resistor 73. The regulator output potential derived from this resistor and supplied to the middle point of the transformer winding 65 thus becomes more positive in relation to ground and to the rectifier cathode 60 than before. In consequence the rectifier voltage is increased and the D. C. current, supplied to the transmission line 1, will become higher. In the inverter station, however, the negative main signal cannot affect the regulator 11 because the main signal as a rule is lower than the positive auxiliary voltage supplied by the transmitter 23. Therefore only the rectifier station, under normal service conditions, reacts on frequency variations in the receiving network 8. Due to the power current increase a rapidly increasing and slowly decreasing current signal will arise across the resistor 39, which is supplied by the measuring magnetic amplifiers 14 and 15 respectively via the rectifiers 16 and 17 respectively and through the capacitors 38. A signal voltage then occurs across the terminals 33 and 34 of the transmitter 12 and the terminals 55 and 56 of the transmitter 13. These signals are applied with a positive polarity and counteract the main signal. The power current increase is therefore interrupted before the frequency has attained its normal value. By and by the current signal and the main signal return to the zero values without hunting. The main task of the current signal will be clear from the processes occurring at power plant faults, for instance on the occasion of a commutation failure in the inverter or another short circuit in the D. C. power system. In such a case the main signal would either act with an incorrect tendency or, due to the inertia of the A. C. network, with a large delay. Then a current surge through the rectifier 3 is counteracted by the maintaining action of the current signal. Via the measuring magnetic amplifier 14, the rectifier 16, the capacitor 38 and the resistor 39 a positive signal is supplied by the transmitter 12 to the regulator 10 which makes the rectifier voltage decrease thus preventing a power current increase. Thus the current signal tends to maintain the power current on its actual value. The transmitter 13 in the inverter station has a similar task. At faults in the rectifier 3 the rectifier voltage and the power current may decrease. By means of the components 15, 17, 19, 38 and 39 a negative signal is supplied to the resistor 88. The voltage drop thereacross is increased. The current in the amplifier tube is decreased and the current in the output tube 83 is increased. The voltage drop across the resistor 84 is increased, the middle point potential of the transformer winding 71 becoming more positive. As a consequence the inverter voltage is decreased with the result that the power current is maintained substantially on its value prevailing before, in spite of the decrease of the rectifier voltage. Gradually the current signal returns to zero but then the slower acting main signal will overtake the increase of the power current via the transmitter 21. The negative current signal, occurring on the occasion of a decreasing power current, is able to affect the regulator 11 only if the signal value exceeds the positive signal supplied by the auxiliary transmitter 23. This transmitter prevents, under normal service conditions, the inverter from participating in control actions with the purpose of eliminating negative frequency deviations or power current decrease. Under the described conditions the main control and the feed back control can be left to the rectifier whilst the inverter only has to keep the D. C. voltage constant. The earlier described electric valve 95 in the inverter station prevents in a corresponding way positive frequency deviations and power current increase from affecting the inverter control system.

Under the normal service and faults conditions described above it had been presumed that the main signal, i. e. the controlled quantity or its deviations from a reference value, by means of a telemetering equipment is telemetered from the A. C. network 8 to the rectifier station and its transmitter 20. However, it must be reckoned with that such a telemetering equipment for one or another reason is out of function. This means that the main signal cannot be supplied to the rectifier regulator 10 and that the rectifier 3 cannot fulfil the intended control tasks. Under such a condition the control system is changed to another way of running, in the following called reserve service. Then the contacts 27, 28, 29 and 30 change their positions by none-shown actions, the contacts 27 and 30 opening and 28 and 29 closing. That means that the main signal transmitter 20 no longer is able to affect the regulator 10 and the auxiliary signal transmitter 23 no longer can affect the inverter regulator 11. Instead of that the corresponding auxiliary transmitter 22 is connected in in the rectifier station. Besides this the restraining signal transmitter 24, the function of which will be described later on, is connected to the inverter regulator 11. In a way, not shown, now the rectifier 3 determines the transmission voltage of the power plant whilst the controlled quantity, which also under these conditions is assumed to be a frequency, assumes predetermined values by means of the inverter regulator 11. If for instance the frequency in the A. C. network 8 drops, the main signal, occurring between the terminals 53 and 54 in the transmitter 21, will be negative, the regulator 11 decreasing the voltage of the inverter 4. The power current will then increase and a positive current signal will be supplied to the regulator 11 via the transmitter 13, the quantity acting stabilizing on the control process. The limiting action by means of the electric valve 95, described for the normal conditions, is no longer effective now because the regulator has increased its output potential in order to set the inverter to the lower inverter voltage which is required now. Because the auxiliary transmitter 23 is no longer connected to the regulator 11 the regulator can without limitations affect the grid control of the inverter in an increasing or decreasing tendency. For similar reasons the electric valve 82, on the other side, becomes effective in respect to the rectifier control 3.

Hereby it is prevented partially that a power current decrease can result in a control action by means of the transmitter 12, partially that the auxiliary transmitter 22, now connected in via the contact 29, by its negative output voltage can cause a D. C. voltage increase in the rectifier station. Further the auxiliary transmitter opposes, due to its negative signal, to a decrease of the rectifier voltage which could be caused by the transmitter 12, which senses positive alterations of the transmitted power current. In order to prevent positive current signals, occuring in the rectifier control device at power current increase, from acting under reserve service conditions, the main signal action is restrained in the inverter station. This is obtained by means of the transmitter 24, connected in parallel with the main signal transmitter 21. If the main signal attains a too high negative value, which otherwise might cause a too heavy power current increase, the negative voltage of the transmitter 24 is more positive than that of the transmitter 21. A circuit is then closed from transmitter 24 through the auxiliary valve 25, the contact 28, the resistor 26 to the transmitter 21, making the negative voltage of this transmitter uneffective in respect to the regulator 11. By these measures the rectifier 3 is therefore prevented from opposing to control actions of the inverter 4. Thus the inverter 4 can alone regulate the controlled quantity to a constant value. Under these reserve service conditions under which on the occasion of telemetering failures the transmission voltage setting is moved from the inverter station to the rectifier station whilst the inverter station tends to regulate the controlled quantity to a constant value, the current signal tends to maintain the power current on its prevailing value at power plants faults. On the occasion of a fault in same part of the rectifier 3, causing a power current decrease, the transmitter 13 senses via the measuring magnetic amplifier 15 and its auxiliary apparatus the power current decrease in the transmission line. Then the transmitter 13 supplies a negative current signal to the regulator 11 which decreases the inverter voltage and thereby increases the power current up to the value prevailing before. In a similar way the transmitter 12 in the rectifier station endeavours to reduce the power current to its value prevailing before when this current tends to increase due to a commutation failure in the rectifier or due to another short circuit in the D. C. power system. A positive current signal is then supplied by the transmitter 12 to the rectifier regulator 10. When this signal has attained a value which is at least equal to the negative signal supplied by the auxiliary signal transmitter 22, the regulator 10 is affected, thereby decreasing the rectifier voltage and maintaining the power current on its earlier prevailing value.

The description of the normal and reserve service conditions in the power plant is based on the collaboration between the current signal and main signal shown in Fig. 2. The current signal is depending on the power current alterations due to the capacitor 38 whilst the main signal is depending on the deviations of the controlled quantity from a reference value. Here the capacitor serves as a derivating element. Of course, instead of the capacitor 38 other derivating elements may be used. Instead of the series connected capacitor a parallel connected reactor may transmit the power current alteration to the regulator. The same features as the scheme shown for the transmitters 12 and 13 respectively according to Fig. 2 are also found in the scheme according to Fig. 5. The voltage prevailing across the resistor 57 between the terminals 31 and 32 and derived from the measuring magnetic amplifier is compared with a voltage derived from a potentiometer 51 by means of the movable contact 50. The contact 50 is set by a motor 52, working according to the zero method, the motor directly or via an intermediary device being driven in one or the opposite direction when a positive or negative difference exists between the voltage across 57 and the voltage across 50. Under balance conditions, i. e. when the voltages are equal, the motor 52 stands in its zero position and the voltage difference, built up by the resistors 58 and 59 and supplied to the regulator 10 via the terminal 34, is zero. At power current alterations a positive or negative voltage difference appears and affects the regulator 10. This difference is gradually eliminated because the motor 52 with a certain speed moves the movable contact 50 with the result that the two voltages finally will be equal again.

Also the collaboration between the current signal and the main signal may be carried out in another way than that one shown in Fig. 2. Thus Fig. 3 shows a variant according to which the regulators 10 and 11 respectively are affected by a current signal mainly proportional to the power current. In this variant there is no derivating element. The main signal on the other side is mainly proportional to the controlled quantity reproduced by the receiver 43. The controlled quantity, as mentioned above, may either be measured locally or be telemetered from another station. According to this scheme the control system is in balance if a defined power current flows on the line at a certain value of the controlled quantity, i. e. at a certain frequency value. That means that occurring frequency deviations are not completely eliminated but that the control system has a certain measuring error. If this, however, is small the controlled quantity can be obtained with desired accuracy. A further variant, mainly equivalent to that one shown in Fig. 2, is clear from Fig. 4. In this case the transmitters 12 and 13 respectively supply a signal substantially proportional to the power current value. The main signal, supplied by the transmitters 20 and 21 respectively via the terminals 35 and 36 to the regulator 10 of the rectifier and 11 and the inverter respectively, is built up of the controlled quantity itself and an additional quantity, which controlled by the deviation of the controlled quantity from a reference value slowly attains such a value that this deviation is regulated to zero by the control system. The controlled quantity is here represented by the receiver 47, the voltage of which by means of the motor 46 being compared with the reference voltage derive from the potentiometer 48 by means of the movable contact 49. The motor is run in one or the other direction as long as a deviation exists and thereby moves the movable contact 44 on the potentiometer 45 in one or the opposite direction. The regulators 10 and 11 respectively therefore sense the sum of the voltages supplied by the receiver 47 and derived from the potentiometer 45 respectively.

The power plant shown in Fig. 1 comprises only one rectifier station and one inverter station. The invention, however, can also be applied to stations in high voltage D. C. power transmission plants containing more than one rectifier station and/or one inverter station. At least one of these then determines the transmission voltage and at least one other of them regulates its D. C. voltage in such a way that a controlled quantity assumes predetermined values. In at least one of the converter stations the current signal and the main signal affect a common regulator. The auxiliary signal transmitters 22 and 23 respectively are effective in those of the converter stations which determine the transmission voltage, and in these stations the control system is also prevented from to be affected by the current signal in more than one direction. For this purpose may for the rest other means be used for limiting action than those mentioned above, acting between the regulator output and the converter grid control system. An electric valve, for instance, may limit the current signal action in the undesired direction before or in the regulator.

As mentioned in the introduction the controlled quantity need not be the frequency in the receiving A. C.-network. If the D. C. power transmission is designed to supply a constant power contribution to the A. C.-network at least under certain conditions at certain times, the D. C. power transmitted on the power line or the transmitted current itself may be the controlled quantity. These values are then regulated to be constant by introducing them in the main signal which regulates at least one of the converter stations not determining the transmission voltage. Finally the main signal instead of being influenced by the controlled quantity, may as mentioned, be depending on the transmission voltage which has to be determined by at least one of the converter stations.

I claim as my invention:

1. In a system which includes means for high voltage D. C. transmission of power current between static converter stations each including at least one converter, a mixing device having its output operatively connected to the grid of at least one converter to regulate the grid potential thereof, a first means responsive to variations in one of the electrical quantities of the system for supplying a first signal to said mixing device, and a second means more rapidly responsive than said first means and responsive to any alterations in the transmitted D. C. power current for supplying a second signal to said mixing device in a direction to counteract said alterations.

2. A control device according to claim 1 comprising a third means responsive to a predetermined standard quantity for supplying a third unidirectional signal to said mixing device whereby to counteract said second signal in one direction thereof.

3. A control device according to claim 1, comprising a third means responsive to a predetermined standard quantity for supplying a third unidirectional signal to said mixing device in such a direction that it counteracts said second signal on the occasion of a decrease in power current.

4. A control device according to claim 1, comprising a fourth means responsive to a predetermined standard quantity for supplying a fourth unidirectional signal to said mixing device in such a direction that it counteracts said first signal in one direction thereof.

5. A control device according to claim 1, comprising a third means responsive to a predetermined standard quantity for supplying a third unidirectional signal to said mixing device in a direction to counteract one of said first and second signals in one direction thereof, a fourth means responsive to a predetermined standard quantity for supplying a fourth unidirectional signal to said mixing device in a direction to counteract the other of said first and second signals in one direction thereof, and switch means for selectively connecting said third and fourth means to said mixing device.

6. A control device according to claim 1 in which said first means is responsive to the difference between said electrical quantity and a predetermined quantity.

7. In a control device according to claim 6, said second means being responsive to the rate of change of said alterations.

8. In a control device according to claim 7, said second means comprising a condenser.

9. In a control device according to claim 7, said second means comprising electrical follow-up means for slowly and automatically assuming and reproducing an electrical value which corresponds to the value of the power current, and subtraction means for supplying the difference between the power current value and the follow-up means value to the mixing device.

10. A control device according to claim 1, said first means being responsive only to said quantity, said second means being responsive only to the value of the power current.

11. In a control device according to claim 1, said first means comprising means responsive only to said quantity and reference means for supplying an electrical reference value, and an electrical follow-up means connected to said quantity responsive means and said reference means for slowly and automatically eliminating the deviation of said quantity from said reference value and for supplying an additional value, and means for combining said quantity value and said additional value.

12. A control device according to claim 1, comprising unidirectional limiting means connected to the output of said mixing device for limiting said output potential in one direction thereof.

References Cited in the file of this patent

UNITED STATES PATENTS

| | | |
|---|---|---|
| 1,280,769 | Langmuir | Oct. 8, 1918 |
| 2,027,235 | Klemperer | Jan. 7, 1936 |
| 2,202,726 | Bedford | May 28, 1940 |
| 2,224,645 | Eichberg | Dec. 10, 1940 |